1

United States Patent
Yanagisawa

(10) Patent No.: US 9,582,336 B2
(45) Date of Patent: *Feb. 28, 2017

(54) SHARED RESOURCE SEGMENTATION

(71) Applicant: INTERNATIONAL BUSINESS MACHINES CORPORATION, Armonk, NY (US)

(72) Inventor: Hiroki Yanagisawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/788,012

(22) Filed: Jun. 30, 2015

(65) Prior Publication Data

US 2015/0301868 A1   Oct. 22, 2015

Related U.S. Application Data

(63) Continuation of application No. 13/710,580, filed on Dec. 11, 2012, now Pat. No. 9,104,495.

(51) Int. Cl.
| | |
|---|---|
| *G06F 13/00* | (2006.01) |
| *G06F 9/50* | (2006.01) |
| *G06F 9/48* | (2006.01) |
| *G06F 9/455* | (2006.01) |

(52) U.S. Cl.
CPC ........ *G06F 9/5077* (2013.01); *G06F 9/45533* (2013.01); *G06F 9/4881* (2013.01); *G06F 2209/485* (2013.01); *G06F 2209/504* (2013.01); *Y02B 60/142* (2013.01)

(58) Field of Classification Search
CPC .... G06F 9/45533; G06F 9/4881; G06F 9/505; G06F 9/544
USPC .............................. 718/1, 105, 107; 719/312
See application file for complete search history.

(56) References Cited

U.S. PATENT DOCUMENTS

| | | | |
|---|---|---|---|
| 9,081,621 B2 * | 7/2015 | Fahrig | ........... G06F 9/5077 |
| 2012/0198447 A1 | 8/2012 | Osogami et al. | |

FOREIGN PATENT DOCUMENTS

| | | |
|---|---|---|
| JP | 2825850 B2 | 11/1998 |
| JP | 2004199561 A | 7/2004 |
| JP | 2004252988 A | 9/2004 |
| JP | 2010117760 A | 5/2010 |
| JP | 2010140340 A | 6/2010 |

(Continued)

OTHER PUBLICATIONS

Bichler, M., et al. "Capacity Planning for Virtualized Servers" Workshop on Information Technologies and Systems (WITS). Dec. 2006. (6 Pages).

*Primary Examiner* — Andy Ho
(74) *Attorney, Agent, or Firm* — Tutunjian & Bitetto, P.C.; Vazken Alexanian

(57) ABSTRACT

Methods and systems for resource segmentation include dividing a time horizon to be partitioned into time slots based on a minimum partition size; determining resource usage for multiple virtual machines in each of the plurality of time slots; determining a set of partitioning schemes that includes every possible partitioning of the time slots into a fixed number of partitions; for each partitioning scheme in the set of partitioning schemes, determining a cost using a processor based on a duration of each partition and a resource usage metric; and selecting a partitioning scheme that has a lowest cost.

17 Claims, 4 Drawing Sheets

(56) References Cited

FOREIGN PATENT DOCUMENTS

JP         2010250689  A    11/2010
WO    WO2009066481  A1     5/2009

* cited by examiner

SHARED RESOURCE SEGMENTATION

RELATED APPLICATION INFORMATION

This application is a Continuation application of U.S. Pat. No. 9,104,495, filed on Dec. 11, 2012 and issued on Aug. 11, 2015, incorporated herein by reference in its entirety.

BACKGROUND

Technical Field

The present invention relates to computing resource sharing and, more particularly, to segmentation of computing resources between multiple virtual machines on a single set of hardware.

Description of the Related Art

Virtualization allows service providers to run multiple virtual machines (VMs) on a single server, such that each virtual machine operates wholly independently of the others. However, the total computing capacity of the VMs on a single server, whether that capacity is measured in processing power, memory, or some other quantity, cannot exceed the physical capacity of the hardware used to maintain the VMs. Naturally, service providers wish to maximize the number of VMs served with given hardware, because the cost of adding VMs is small compared to the cost of adding new hardware.

Existing techniques for VM packing partition a time horizon into multiple time slots, where each twenty-four hour period may be split into, e.g., three blocks of eight hours each. This partitioning may take into account differing levels of resource usage depending on the time of day, such that VMs with high needs during, e.g., an afternoon segment may be placed on servers with VMs that have low needs during the afternoon but high needs during the night. In some cases, maximum CPU usage in a time slot is used to characterize the VMs.

However, this partitioning is usually performed manually, using fixed-length partitioning. For example, the time partitions may be fixed at eight hours long. This leads to suboptimal partitioning in many cases, because a given partition may not give the best results for a specific set of VMs. As such, conventional partitioning may lead to a sub-optimal use of available resources.

SUMMARY

A method for resource segmentation includes dividing a time horizon to be partitioned into a plurality time slots based on a minimum partition size; determining resource usage for each of a plurality of virtual machines in each of the plurality of time slots; determining a set of partitioning schemes that comprises every possible partitioning of the time slots into a fixed number of partitions; for each partitioning scheme in the set of partitioning schemes, determining a cost using a processor based on a duration of each partition and a resource usage metric; and selecting a partitioning scheme that has a lowest cost.

A method of resource segmentation includes dividing a time horizon to be partitioned into a plurality time slots based on a minimum partition size; determining resource usage for each of a plurality of virtual machines in each of the plurality of time slots; determining a set of partitioning schemes that comprises every possible partitioning of the time slots into a fixed number of partitions; for each partitioning scheme in the set of partitioning schemes, determining a cost using a processor based on a duration of each partition and a quantity that characterizes resource consumption by a set of virtual machines during said partition; and selecting a partitioning scheme that has a lowest cost by progressively comparing each partitioning scheme's cost to a current lowest cost and updating said current lowest cost when a partitioning scheme having a lower cost is found.

A system for resource segmentation is shown that includes a cost module comprising a processor configured to divide a time horizon to be partitioned into a plurality time slots based on a minimum partition size, to determine resource usage for each of a plurality of virtual machines in each of the plurality of time slots, to determine a set of partitioning schemes that comprises every possible partitioning of the time slots into a fixed number of partitions, and to determine a cost based on a duration of each partition and a resource usage metric for each partitioning scheme in the set of partitioning schemes; and an optimizing module configured to select a partitioning scheme that has a lowest cost.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide optimal partitioning methods and systems that divide fixed resources among different processes according to time-sensitive resource usage. It is specifically contemplated that the present embodiments may be applied to the partitioning of virtual machines (VMs) on servers in a multi-tenant system, but it should be recognized that the principles may be extended to other types of data and resource usage. For example, the present principles may be applied to partitioning network bandwidth based on network packet transmission history.

Figure 1:
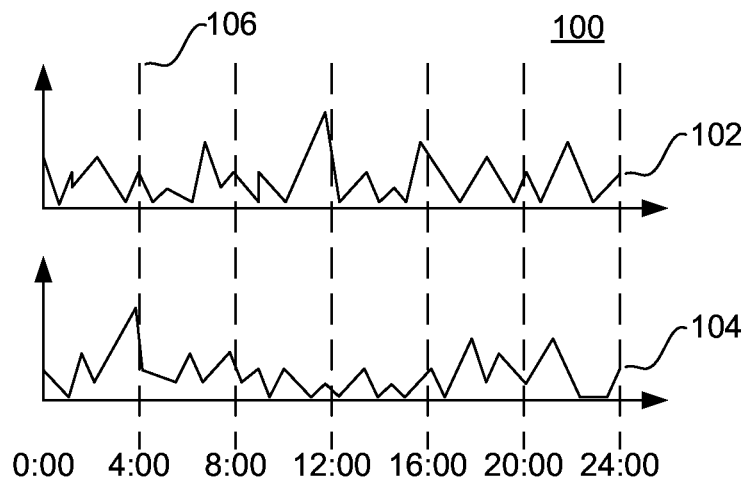
FIG. 1 is an exemplary virtual machine (VM) usage scenario.

Referring now to FIG. 1, an exemplary VM resource usage scenario 100 is shown. The present principles allow flexible partitioning according to the needs of the particular VMs being allocated. In the scenario shown, the resource usage patterns of two VMs, 102 and 104, are shown over a twenty-four hour time period. The time period is segmented into blocks of four hours 106, representing an exemplary minimum partition size. This minimum partition size can be selected to be any size, and the determined partitions can be any multiple of the minimum size. In this example, the respective VMs use some percentage of the resources of a given server at each point in time, but at no point do their combined resource usages exceed 100% of said capacity. As such, there exists some partitioning which will accommodate both VMs in a single server.

Figure 2:
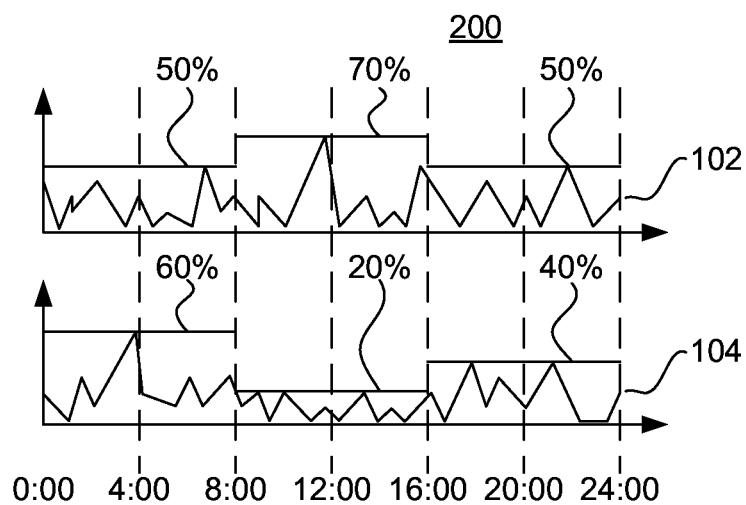
FIG. 2 is the exemplary VM usage scenario partitioned into three partitions having fixed length, with costs calculated according to the present principles.

Referring now to FIG. 2, an exemplary partitioning 200 of the VM resource usage scenario 100 is shown using fixed-length partitioning. Each of the partitions is eight hours long, and the maximum resource usage for each VM 102 and 104 during that time is employed as a metric for determining each VM's needs. In this example, the partition lasting from 0:00 to 8:00 has a combined resource usage between VMs 102 and 104 that exceeds 100% of the capacity of the server. As a result, this partitioning will force the two VMs 102 and 104 into separate servers, which is a sub-optimal partitioning.

Figure 3:
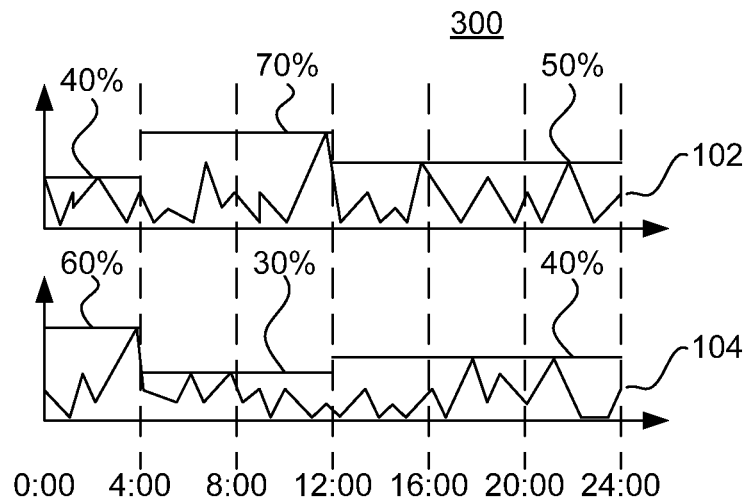
FIG. 3 is the exemplary VM usage scenario partitioned into three partitions having variable lengths with costs calculated according to the present principles

Referring now to FIG. 3, an exemplary partitioning 300 of the VM resource usage scenario 100 is shown using variable-length partitioning according to the present principles. The present principles consider all possible partitions of the time horizon into a set number of parts using a minimum partition size (in this case, four hours), including that shown in FIG. 2. In the exemplary partition of FIG. 3, partitions are established according to the four-hour minimum partition size, such that the combined VM usage for a given partition stays within the fixed resource capacity.

Figure 4:
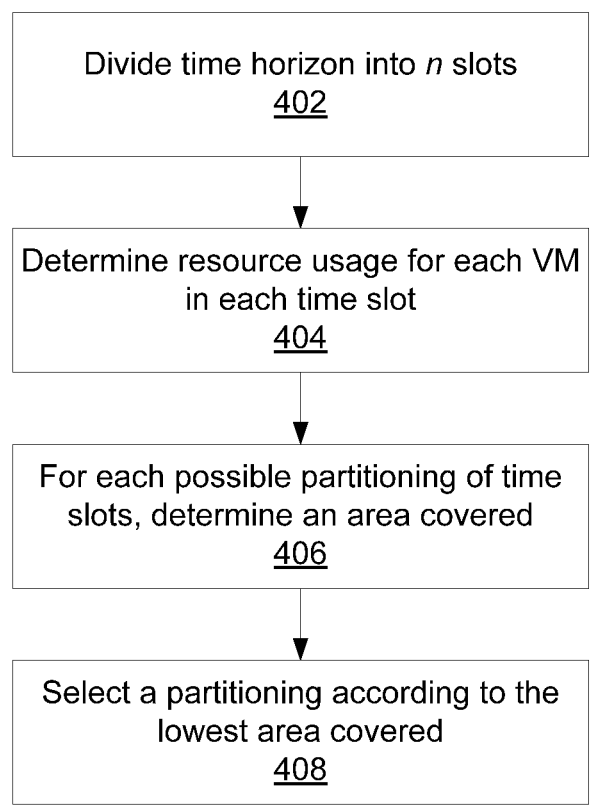
FIG. 4 is a block/flow diagram of a method for optimally partitioning resources according to the present principles.

Referring now to FIG. 4, a method for variable-length resource segmentation is shown. Block 402 takes a specified time horizon and divides it into n slots according to a minimum partition size. The time horizon reflects an expected periodicity of resource usage. For example, if usage depends on the time of day, the time horizon may be twenty-four hours long with n=48 time slots that are each thirty minutes long. Block 404 considers a set of VMs and determines a resource usage for each VM in each time slot. This resource usage may be determined according to any appropriate metric. In the examples above, maximum CPU usage was shown as the metric, but it is contemplated that other metrics may be used such as, e.g., average CPU usage, bandwidth usage, memory usage, etc. The metric may be chosen according to anticipated use for the VMs. VMs engaged in a more computationally intensive task may be partitioned according to CPU usage, while webservers may be partitioned according to bandwidth usage and databases may be partitioned according to memory usage. The usage for each VM is characterized as the function $c(i,t_1,t_2)$, with i being an index for the VM in question and a partition being defined as the time period $[t_1,t_2]$. Block 404 computes this function for every VM and every possible partition. In the example of a twenty-four hour time horizon with half-hour time slots, the function $c(i,t_1,t_2)$ will be computed $48^2$ times for each VM i.

Block 406 considers every possible partition of time slots and determines an area on, e.g., usage graph 100. This can be represented as $$\sum_{j=0}^{p-1} (t_{j+1} - t_j) \sum_i c(i, t_j, t_{j+1}),$$

which finds a quantity for each possible partitioning, weighting the resource usage in a given partition by the duration of that partition. Block 408 minimizes this formulation, selecting a partitioning according to the lowest area covered.

Using the examples of the partitioning of FIGS. 2 and 3, it can be seen how the above process selects a partitioning. In FIG. 2, each partition is 8 hours long, so the weighted usage of the two VMs 102 and 104 is 8(0.5+0.7+0.5)+8(0.6+0.2+0.4)=23.2. The usage of the partitioning in FIG. 3 is (4·0.4+8·0.7+12·0.5)+(4·0.6+8·0.3+12·0.4)=22.8. Because the partitioning of FIG. 3 has the lower weighted usage, it is selected over the less efficient partitioning shown in FIG. 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present principles use one time slot as a fixed starting time. However, this fixed starting time is arbitrary, so the above method may be repeated once for every time slot. For example, a first time slot could be at 0:00, 0:30, 1:00, etc. The entire time horizon is split into p partitions, where the first partition is $[0,t_1]$, the second is $[t_1,t_2]$, and so on. The following pseudo-code implements the present partitioning.

```
// Initialization for k = 1
for t = 1 to n
    cost(1,t) = c(0,t)
end
// Compute for k (>1)
for k = 2 to p
    for t = k to n
        cost(k, t) = infinity
        for t₂ = 1 to t - 1
            tempCost = cost(k-1,t₂) + (t-t₂)c(t2,t)
```

```
            if tempCost < cost(k,t)
                cost(k,t) = tempCost
                previous(k,t) = t₂
            end
        end
    end
end
// output the result
t = n
for k = p to 1
    output t
    t = previous(k,t)
end
```

The functions used in the above pseudo code include $c(t_1,t_2)$, which denotes the total resource usage of all VMs in the time interval $[t_1,t_2]$, cost(k,t), which denotes the minimum objective value of partitioning the time horizon $[0,t]$ into k partitions, and previous(k,t), which gives the starting time of the $k^{th}$ time slot when the time horizon $[0,t]$ is partitioned into k partitions. This pseudo-code progressively builds the partitioning table, starting with an explicitly initialized first partition, k=1.

Figure 5:
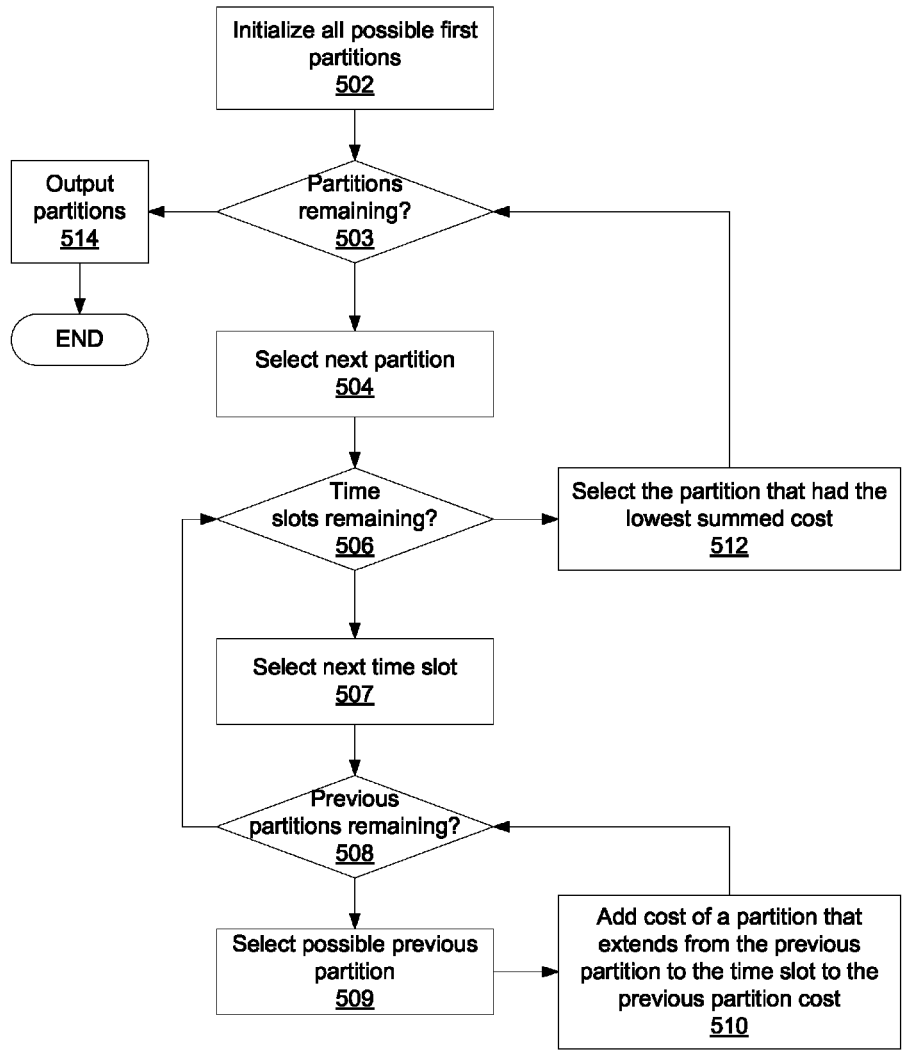
FIG. 5 is a detailed block/flow diagram of a method for optimally partitioning resources according to the present principles.

Referring now to FIG. 5, a method that reflects the above pseudo-code is shown. Block 502 initializes all possible first partitions. This initialization includes setting an initial cost for each partition that starts at the first time slot. As described above, this initial cost may represent, e.g., the maximum CPU usage in that slot or may be based on any other appropriate metric. Block 503 begins a loop that determines whether there are additional partitions left to allocate. The number of partitions is set, as described above, according to the parameter p. If more partitions remain unallocated, block 504 selects the next partition.

Block 506 begins a nested loop over the remaining time slots, starting with the time slot having an index that corresponds with the partition number. For example, if the second partition is being processed, then block 507 begins with the second time slot. Block 508 begins a nested loop over the possible previous partitions either previously initialized or previously processed in an earlier loop iteration. Block 509 selects a next possible previous partition, and block 510 uses the cost of that possible previous partition to determine a temporary cost by adding a cost of the present partition under consideration. Processing then returns to block 508 to determine whether there are more possible previous partitions remaining.

If no previous possible partitions remain to be checked, processing returns to block 506. Block 506 determines whether there are additional time slots to check—if not, block 512 selects the partition that had the lowest summed cost. It should be noted that the selection of block 512 may be performed according to any appropriate selection method. The pseudo-code above describes a progressive search, where a temporary cost is updated whenever a lower cost partition is found. While it is believed that this search is computationally efficient, it should not be considered limiting. After selecting a partition at block 512, processing returns to block 503, which determines whether additional partitions need to be determined. If not, block 514 outputs the partitions that were found and terminates processing. It is worth nothing that the above methods are computationally efficient. For example, in one simulation an optimal partitioning for 100,000 VMs in 24 time slots was found in short time using a state-of-the-art workstation.

Figure 6:
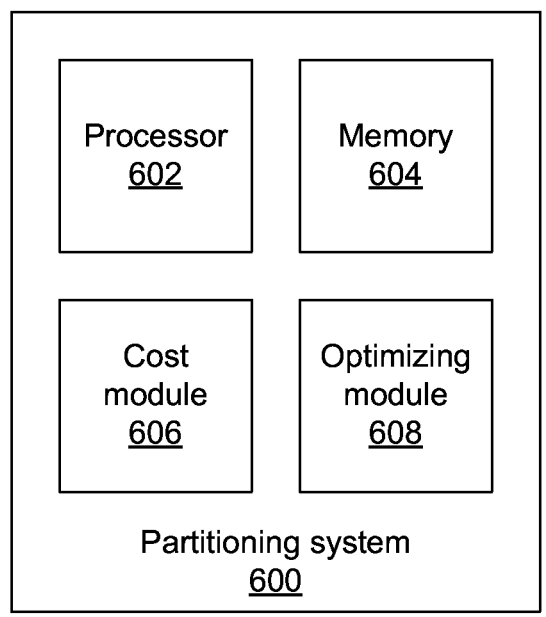
FIG. 6 is a diagram of a system for resource segmentation according to the present principles.

Referring now to FIG. 6, a partitioning system 600 is shown. The partitioning system 600 includes a cost module 606, which uses processor 602 to determine a cost for a particular partition scheme based on resource usage data stored in memory 604. Cost module 606 considers every possible partitioning of a given time horizon into p partitions according to a minimum partition size. Optimizing module 608 then finds the minimum cost of all the possible partitions using processor 602. In the case that multiple partitioning schemes have the same cost, any appropriate tie-breaker may be employed. In the present case, the first such scheme having the minimum cost that is discovered is used. In practice, the limiting factor that controls the number of VMs and time slots that may be scheduled by a partitioning system 600 depends on the size of memory 604 of the system 600, rather than the CPU speed.

Having described preferred embodiments of a system and method for shared resource segmentation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for resource segmentation, comprising:
   determining a set of partitioning schemes that comprises every possible partitioning of a plurality of time slots over a time horizon into a fixed number of partitions;
   for each partitioning scheme in the set of partitioning schemes, determining a cost using a processor based on a duration of each partition and a resource usage metric; and
   selecting a partitioning scheme that has a lowest cost.

2. The method of claim 1, wherein determining the cost comprises multiplying a duration for a partition by a quantity that characterizes resource consumption by a set of virtual machines during said partition.

3. The method of claim 2, wherein the quantity that characterizes resource consumption is a percentage of resource capacity used, combined across the set of virtual machines.

4. The method of claim 2, wherein the quantity that characterizes resource consumption is a maximum processor usage during the petition.

5. The method of claim 2, wherein the quantity that characterizes resource consumption is a maximum memory usage during the petition.

6. The method of claim 1, wherein each time slot is sized at a minimum partition size.

7. The method of claim 1, wherein the partitioning scheme that has the lowest cost corresponds to an optimal packing of the virtual machines.

8. The method of claim 1, wherein selecting comprises progressively comparing each partitioning scheme's cost to a current lowest cost and updating said current lowest cost when a partitioning scheme having a lower cost is found.

9. A system for resource segmentation, comprising:
   a cost module comprising a processor configured to determine a set of partitioning schemes that comprises every possible partitioning of a plurality of time slots over a time horizon into a fixed number of partitions and to determine a cost based on a duration of each partition and a resource usage metric for each partitioning scheme in the set of partitioning schemes; and
   an optimizing module configured to select a partitioning scheme that has a lowest cost.

10. The system of claim 9, wherein the cost module is configured to multiply a duration for a partition by a quantity that characterizes resource consumption by a set of virtual machines during said partition to determine the cost.

11. The system of claim 10, wherein the quantity that characterizes resource consumption is a percentage of resource capacity used, combined across the set of virtual machines.

12. The system of claim 10, wherein the quantity that characterizes resource consumption is a maximum processor usage during the petition.

13. The system of claim 10, wherein the quantity that characterizes resource consumption is a maximum memory usage during the petition.

14. The system of claim 9, wherein each time slot is sized at a minimum partition size.

15. The system of claim 9, wherein the partitioning scheme that has the lowest cost corresponds to an optimal packing of the virtual machines.

16. The system of claim 9, wherein the optimizing module is further configured to progressively compare each partitioning scheme's cost to a current lowest cost and updating said current lowest cost when a partitioning scheme having a lower cost is found.

17. A non-transitory computer readable storage medium comprising a computer readable program for resource segmentation, wherein the computer readable program when executed on a computer causes the computer to perform the steps of:
   determining a set of partitioning schemes that comprises every possible partitioning of a plurality of time slots over a time horizon into a fixed number of partitions;
   for each partitioning scheme in the set of partitioning schemes, determining a cost using a processor based on a duration of each partition and a resource usage metric; and
   selecting a partitioning scheme that has a lowest cost.

* * * * *